(12) United States Patent
Dominguez, Jr. et al.

(10) Patent No.: US 7,054,111 B2
(45) Date of Patent: May 30, 2006

(54) DISK DRIVE ACTUATOR-PIVOT ASSEMBLY WITH CORRUGATED RINGS

(75) Inventors: Miguel Dominguez, Jr., San Jose, CA (US); Ambrish Misra, Milpitas, CA (US); Hatem Radwan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 4 days.

(21) Appl. No.: 10/299,513

(22) Filed: Nov. 18, 2002

(65) Prior Publication Data

US 2004/0095683 A1    May 20, 2004

(51) Int. Cl.
*G11B 5/55* (2006.01)
*G11B 21/08* (2006.01)

(52) U.S. Cl. ................... 360/265.6; 360/265.2
(58) Field of Classification Search ............. 360/265.2, 360/265.6
See application file for complete search history.

(56) References Cited

U.S. PATENT DOCUMENTS

| | | | |
|---|---|---|---|
| 5,315,465 A * | 5/1994 | Blanks .................... | 360/265.6 |
| 5,978,180 A | 11/1999 | Lee et al. ................... | 360/106 |
| 6,018,441 A | 1/2000 | Wu et al. ................... | 360/106 |
| 6,163,441 A * | 12/2000 | Wood et al. ............. | 360/266.1 |
| 6,288,878 B1 * | 9/2001 | Misso et al. ............. | 360/265.2 |
| 6,333,839 B1 * | 12/2001 | Misso et al. ............. | 360/265.7 |
| 6,342,992 B1 | 1/2002 | Prater et al. ............. | 360/265.6 |
| 6,349,464 B1 | 2/2002 | Codilian et al. .......... | 29/603.03 |
| 6,411,472 B1 * | 6/2002 | Allsup .................... | 360/265.7 |
| 6,480,363 B1 * | 11/2002 | Prater .................... | 360/265.7 |
| 6,527,449 B1 * | 3/2003 | Koyama et al. ........... | 384/535 |
| 6,606,224 B1 * | 8/2003 | Macpherson et al. .... | 360/265.6 |
| 6,655,847 B1 * | 12/2003 | Obara et al. .............. | 384/535 |
| 6,754,046 B1 * | 6/2004 | Barina et al. ............. | 360/265.6 |

FOREIGN PATENT DOCUMENTS

JP    2000149471 A  *  5/2000

* cited by examiner

*Primary Examiner*—Craig A. Renner
(74) *Attorney, Agent, or Firm*—Bracewell & Giuliani LLP

(57) ABSTRACT

An actuator assembly for a disk drive is provided wherein the pivot cartridge is supported within the bore of the actuator with corrugated end rings. The corrugated end rings provide a uniform distribution of forces on the pivot cartridge and effectively reduce vibrations between the pivot cartridge and the body of the actuator.

10 Claims, 10 Drawing Sheets

DISK DRIVE ACTUATOR-PIVOT ASSEMBLY WITH CORRUGATED RINGS

BACKGROUND OF THE INVENTION

1. Field of the Invention

The invention relates in general to a servo actuator-pivot assembly in a magnetic recording disk drive; and, more particularly to an actuator-pivot assembly which has corrugated end rings.

2. Description of the Background Art

Disk drives using magnetic recording of digital information store most of the information in contemporary computer systems. A disk drive has at least one rotating disk with discrete concentric tracks of data. Each disk drive also has at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator, part of a servo system, which positions the recording head over the specific track of interest. The actuator first rotates the head gimbal assembly to seek the track of interest, and after positioning the recording head over the track, maintains the recording head in close registration to that track. The disk in a disk drive has a substrate and a magnetic layer on the substrate for magnetic recording. The slider carrying the recording head has a disk facing surface upon which an air bearing is constructed. The air bearing allows the slider to float on a cushion of air and to be positioned close to the disk surface. Alternatively, the slider surface facing the disk can be adapted for partial or continuous contact with the disk.

Each new generation of disk drive products generally has an increased density of recorded information. Over the past decade, most of the increase in density has resulted from making the width of the recorded tracks more narrow. As the width of recorded tracks become more and more narrow, greater burdens are placed on the mechanical performance of the actuator system to accurately position the recording head over the track of interest. Excess mechanical vibration, relatively large assembly tolerances, and mechanical distortions or deformations all contribute to a degradation of actuator and servo performance. The necessity of removing such effects is especially important as trackwidths approach a few tens of nanometers.

One source of mechanical deformation is the deleterious mechanical biasing which occurs when a pull screw is used to affix a pivot cartridge in the bore of an actuator arm. The use of a pull screw in an actuator assembly leads to very asymmetrical and uneven forces placed on the pivot cartridge. These uneven forces can make the assembly susceptible to vibrations and can degrade the performance of the actuator.

Thus, an improved method of attaching the pivot cartridge is needed which results in a much more uniform distribution of forces.

SUMMARY OF THE INVENTION

In a preferred embodiment, the invention provides an effective mechanism which significantly equalizes the forces placed on a pivot cartridge as a result of being affixed in an actuator.

In one embodiment, corrugated end rings are used to affix the pivot cartridge in the bore of the actuator arm. Forces are distributed over several indentations of the corrugated end ring. Thus, the forces are much more uniformly distributed on the pivot cartridge. A corrugated end ring may be formed from stainless steel or other suitable material, and may be positioned by press fitting or swaging into the bore of the actuator arm. A groove may be formed in the bore of the actuator arm or in the pivot cartridge to provide a consistent mounting location for the corrugated end ring. A flange may be formed on the corrugated end ring to assist in positioning. Corrugated end rings are effective in reducing vibrations in the actuator.

In another embodiment, a disk drive is provided wherein corrugated end rings are positioned between the actuator arm and the pivot cartridge.

Other aspects and advantages of the invention will become apparent from the following detailed description, which when taken in conjunction with the drawings, illustrate by way of example the principles of the invention.

DETAILED DESCRIPTION OF THE INVENTION

Figure 1:
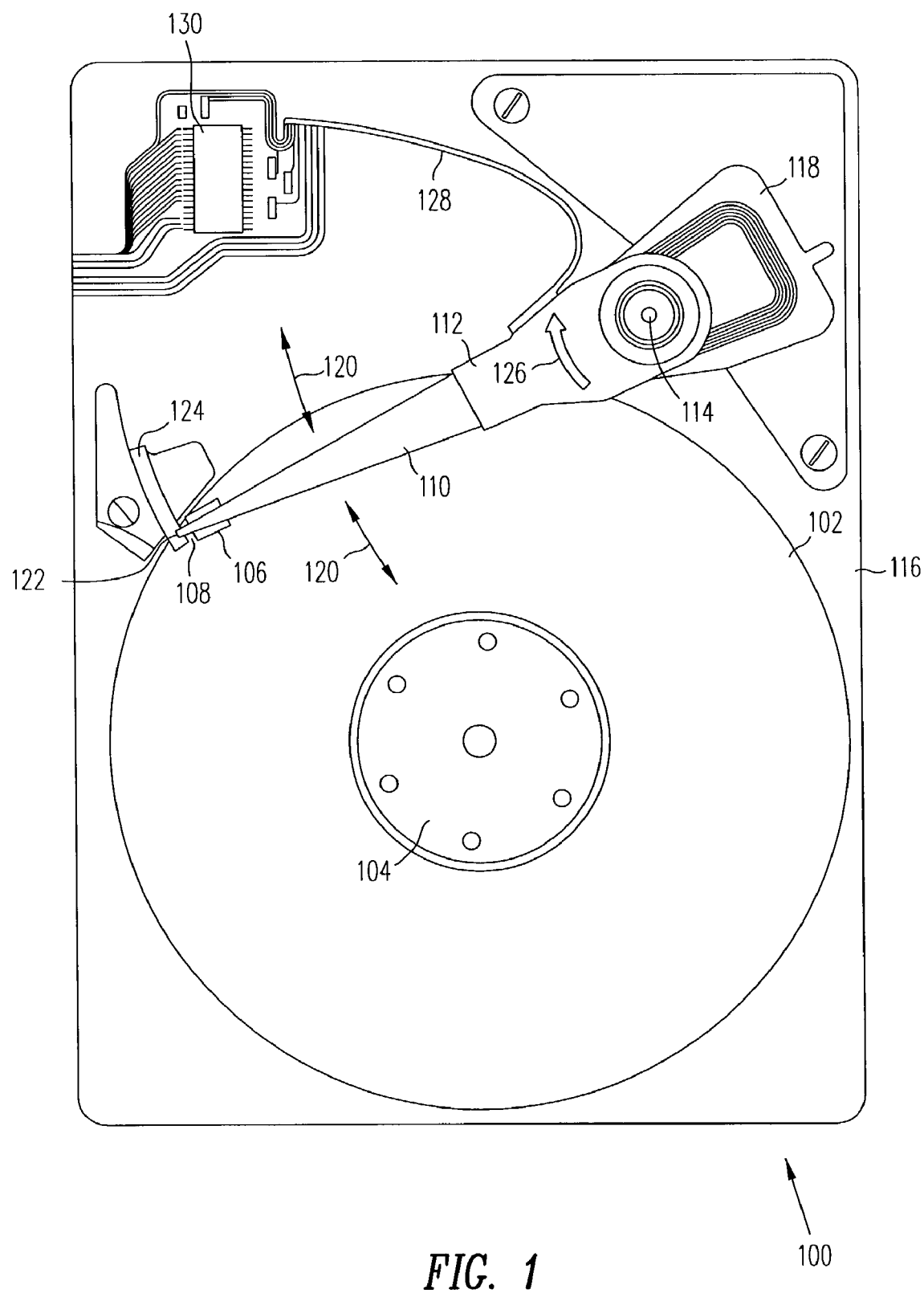
FIG. 1 illustrates a view of a disk drive using the present invention.

As shown in the drawings for purposes of illustration, the invention is embodied in a novel actuator assembly having corrugated end rings positioned between an actuator bore and a cylindrical pivot cartridge. Corrugated end rings allow the forces placed on the pivot cartridge to be much more uniformly distributed thus reducing mechanical distortion, deformation, and vibration.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The slider 106 is attached to a suspension 110 and the suspension 110 is attached to an actuator 112 according to the present invention. The actuator 112 is pivotally attached 114 to the housing 116 of the disk drive 100 and is pivoted by a voice coil motor 118. As the disk is rotating, the actuator 112 positions the slider 106 along with the suspension 110 along a radial arcuate path 120 over the disk 102 surface to access the data track of interest.

Referring to FIG. 1, during operation of the disk drive 100, the motion of the rotating disk 102 relative to the slider 106 generates an air bearing between the slider 106 and the disk 102 surface which exerts an upward force on the slider 106. This upward force is balanced by a spring force from the suspension 110 urging the slider 106 toward the surface of the disk 102. Alternatively, the slider 106 may be in either partial or continuous contact with the disk 102 surface during operation.

FIG. 1 also illustrates an optional load/unload tab 122 on the distal end of the suspension 110. This load/unload tab 122 operates in conjunction with a load/unload fixture 124 to lift the slider 106 away from the disk 102 surface when the disk drive 100 is turned off or enters a power saving mode. When an unload operation is initiated, the actuator 112 rotates far enough in a clockwise direction 126 such that the load/unload tab 122 then slides up the load/unload fixture 124 gently lifting the slider 106 off of the surface of the disk 102. FIG. 1 also shows the electrical connection 128 as wires or a flex cable between the recording head 108 and the preamplifier 130.

Figure 2A:
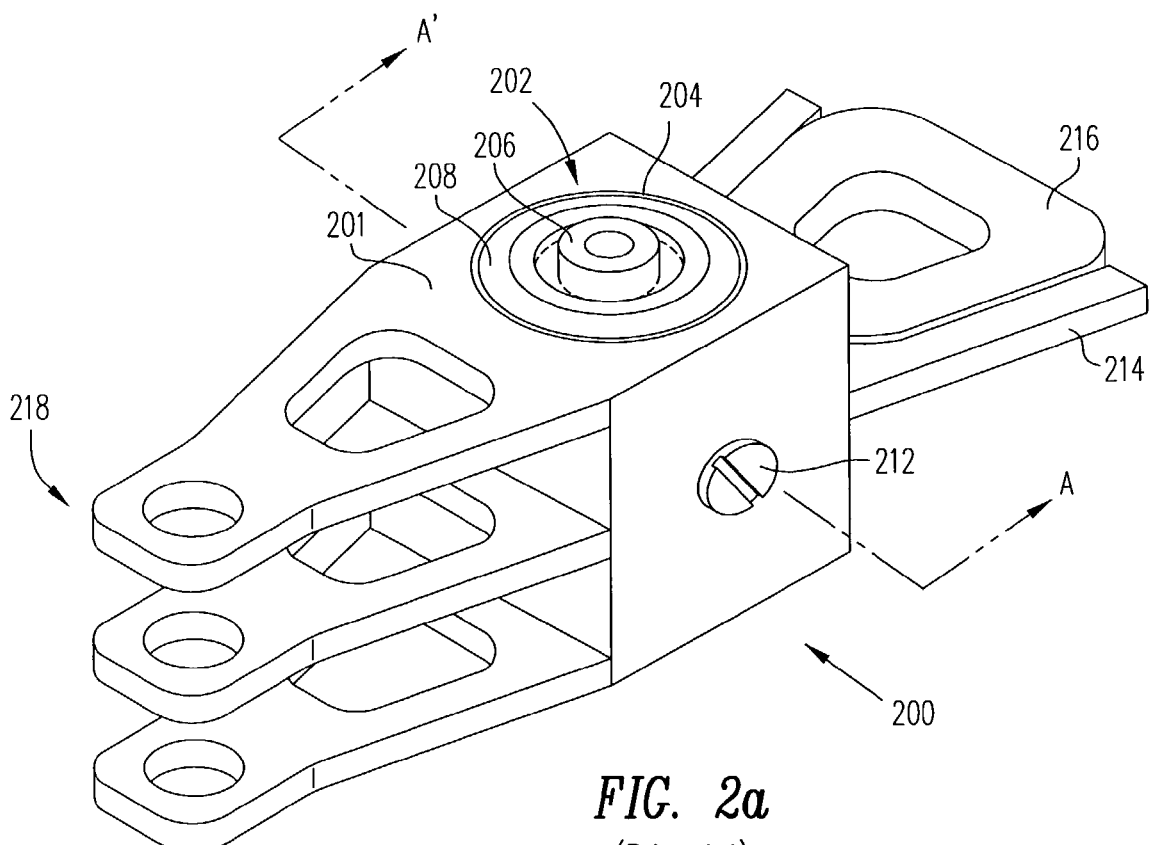
FIG. 2a illustrates a perspective view of an actuator according to the prior art.
Figure 2B:
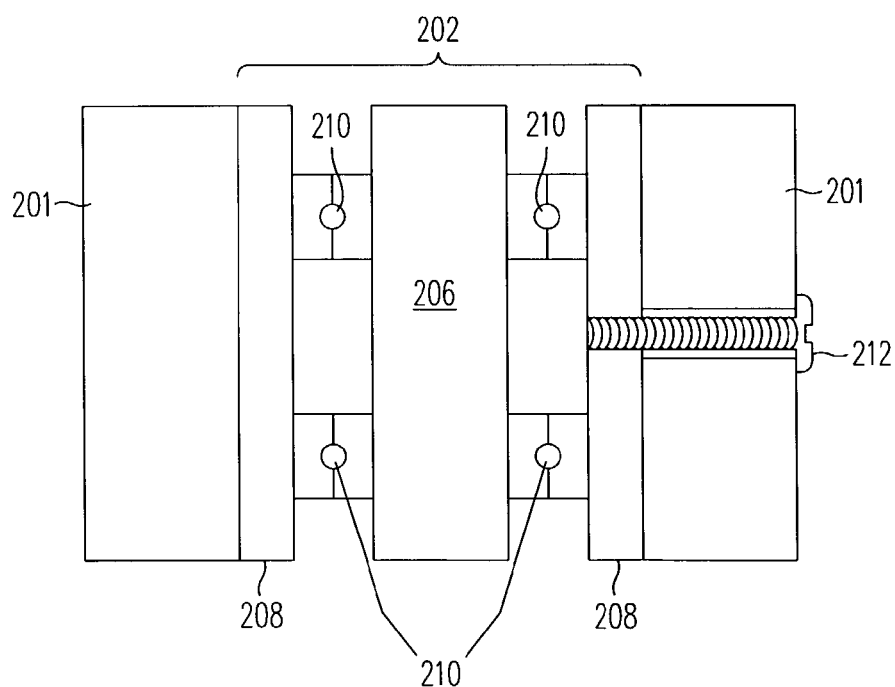
FIG. 2b illustrates a cross sectional view of an actuator according the prior art.

FIG. 2a illustrates a perspective view of a typical actuator assembly 200 according to the prior art. FIG. 2b illustrates a cross sectional view of the actuator 200 along line A–A". The central portion of the actuator 200 has a bore 204 to accept a pivot cartridge 202. The pivot cartridge 202 has an inner post 206 which is rigidly attached to the housing of a disk drive (not shown). The cylindrical outer portion 208 of the pivot cartridge 202 is rotatably connected with the inner post 206 by means such as a ball bearing trace 210. The cylindrical outer portion 208 of the pivot cartridge is typically attached inside the bore 204 of the actuator body 201 with a pull screw 212. One end 214 of the actuator 200 has a coil 216 which cooperates with a fixed magnet (not shown) to form a voice coil motor. The voice coil motor rotates the actuator 200 about the axis of the inner post 206 of the pivot cartridge 202. The end 218 of the actuator 200 opposite from the coil 216 is formed to accept head gimbal assemblies (not shown).

Figure 2C:
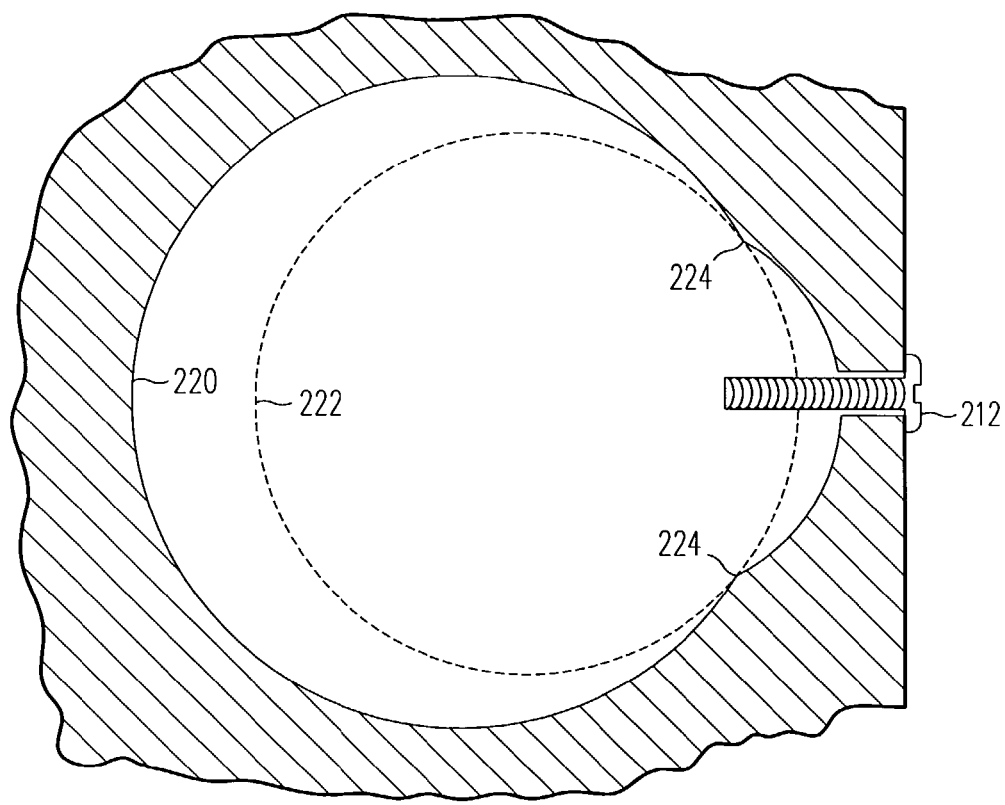
FIG. 2c illustrates the geometrical placement of a pivot cartridge in the bore of an actuator.
Figure 2D:
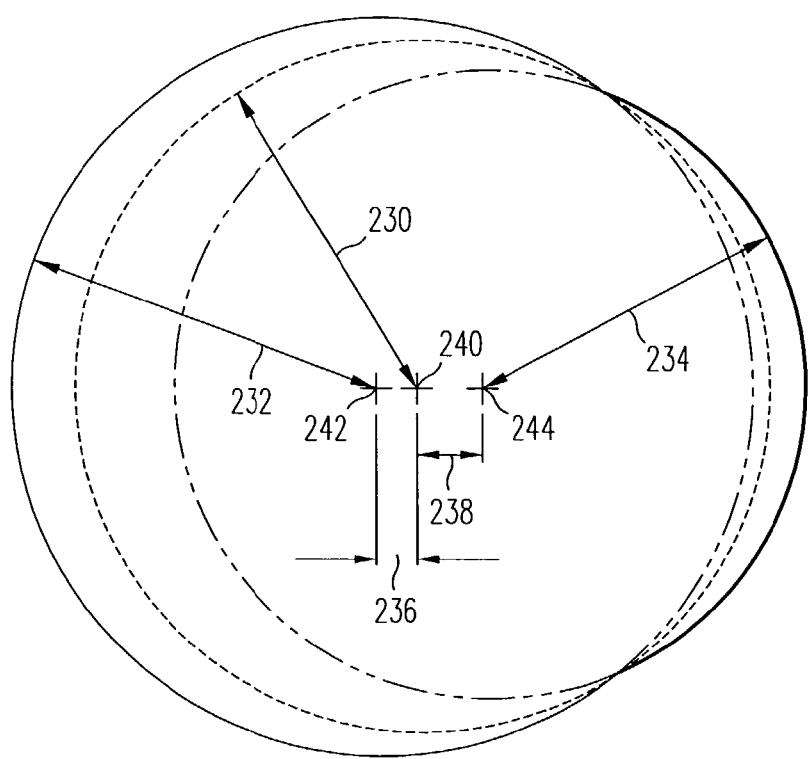
FIG. 2d illustrates a specific example of the geometrical arrangement of a pivot cartridge in the bore of an actuator.

FIG. 2c illustrates a cross sectional view of the bore of a typical actuator. The bore is indicated by the continuous line 220 and the position of the pivot cartridge is indicated by the dashed line 222. The bore is formed by a first milling operation followed by a second milling operation. The radius of curvature of the second milling operation is smaller than the radius of curvature of the first milling operation. Also the center of the two milling operations are offset slightly. The result of forming the bore are two ridges 224 extending the length of the bore which serve as registration locating positions for the pivot cartridge. The location of the pull screw 212 in relation to the two ridges 224 is illustrated. The drawing in FIG. 2c has been exaggerated to emphasize the geometry of the bore. FIG. 2d illustrates typical values for the geometrical features of the bore. A typical radius 230 for a pivot cartridge is 6.00 mm. A typical radius of curvature 232 of the first milling operation is 6.14 mm. A typical radius of curvature 234 of the second milling operation is 4.90 mm. Relative to the position 240 of the center of the pivot cartridge, the center 242 of the first milling operation is typically offset 236 as shown in FIG. 2d to the left by 0.170 mm. Relative to the position 240 of the center of the pivot cartridge, the center 244 of the second milling operation is typically offset 238 to the right by 1.50 mm. The drawing in FIG. 2d is not to scale and the values discussed here are representative only.

Figure 3A:
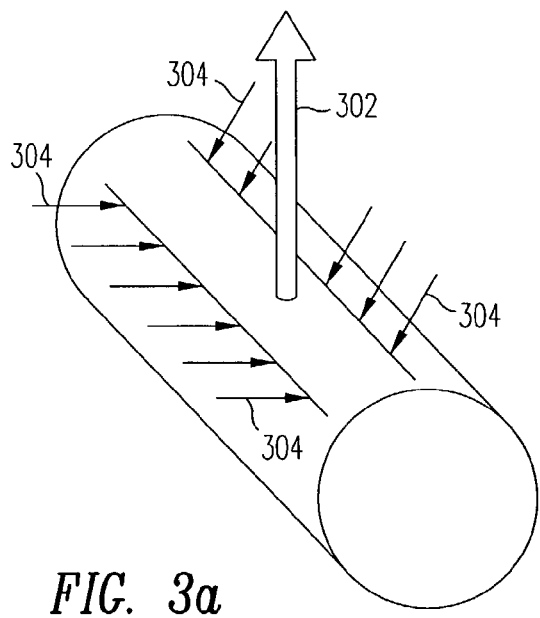
FIG. 3a illustrates a perspective view of the forces on a pivot cartridge according to the prior art.
Figure 3B:
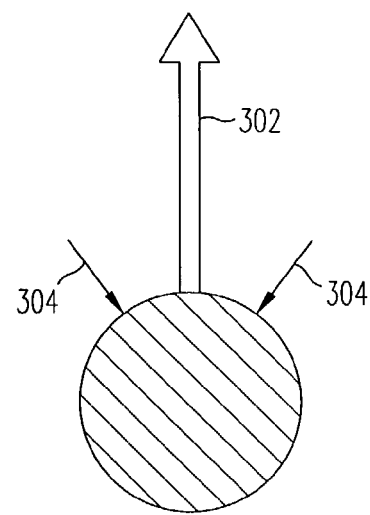
FIG. 3b illustrates a cross sectional view of the forces on a pivot cartridge according to the prior art.

FIG. 3a illustrates a perspective view of the pivot cartridge and the forces exerted on it according to the prior art. FIG. 3b illustrates a cross sectional view of the pivot cartridge and the forces exerted on it. The force from the pull screw is represented by the thick arrow 302. Because of the registration ridges in the bore of the actuator (224 in FIG. 2c), the opposing forces 304 upon the pivot cartridge are concentrated where the pivot cartridge touch the registration ridges.

Figure 4A:
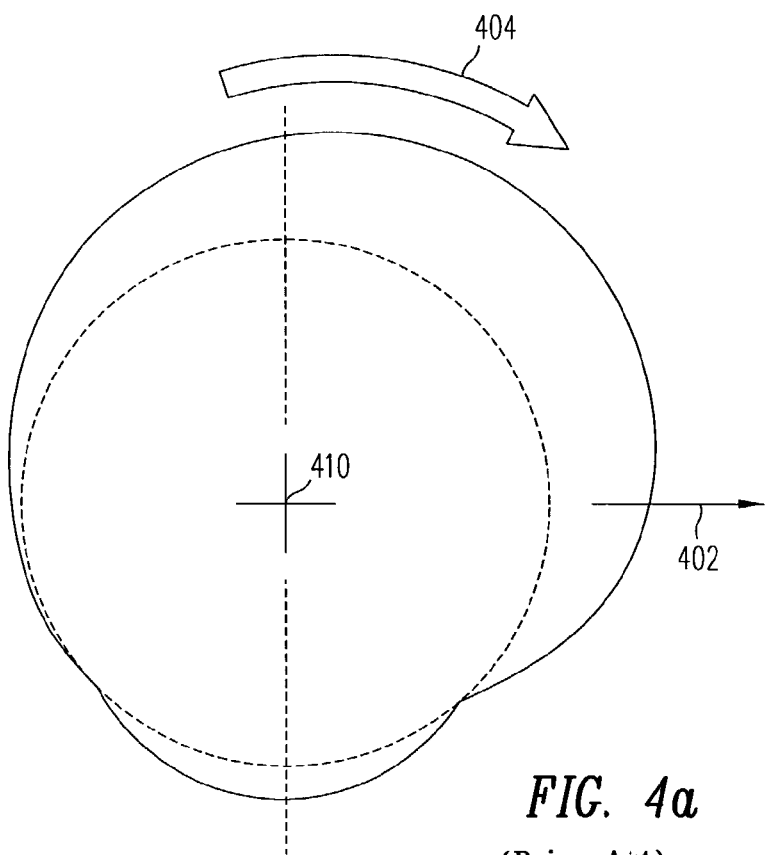
FIG. 4a illustrates the motion according to the prior art of the body of an actuator relative to a pivot cartridge after a seek operation to the right.
Figure 4B:
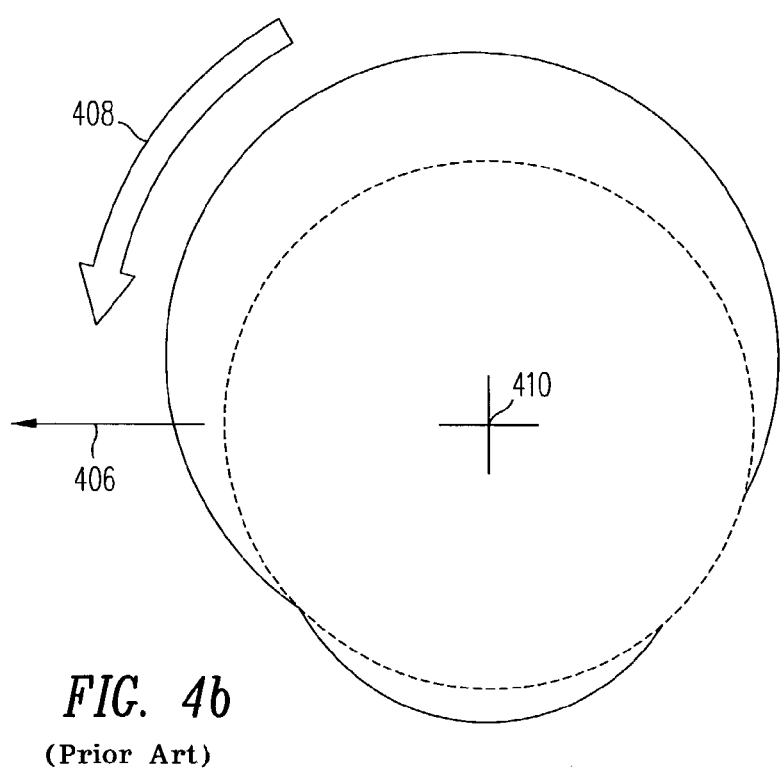
FIG. 4b illustrates the motion according to the prior art of the body of an actuator relative to a pivot cartridge after a seek operation to the left.

One of the shortcomings in the prior art is that the pivot cartridge is effectively attached as a cantilever within the bore of the actuator. This attachment leads to undesirable vibrations during a seeking operation of the actuator. FIGS. 4a and 4b shows the motion of the actuator relative to the center 410 of the pivot cartridge during seeking operations. FIG. 4a illustrates the movement of the actuator preferentially to the right 402 as a seek operation to the right 404 is completed. FIG. 4b illustrates the movement of the actuator preferentially to the left 406 as a seek operation 408 to the left is completed. After a seek to the right or left is completed, the actuator tends to vibrate about the pivot actuator leading to a degradation of servo performance.

Figure 5A:
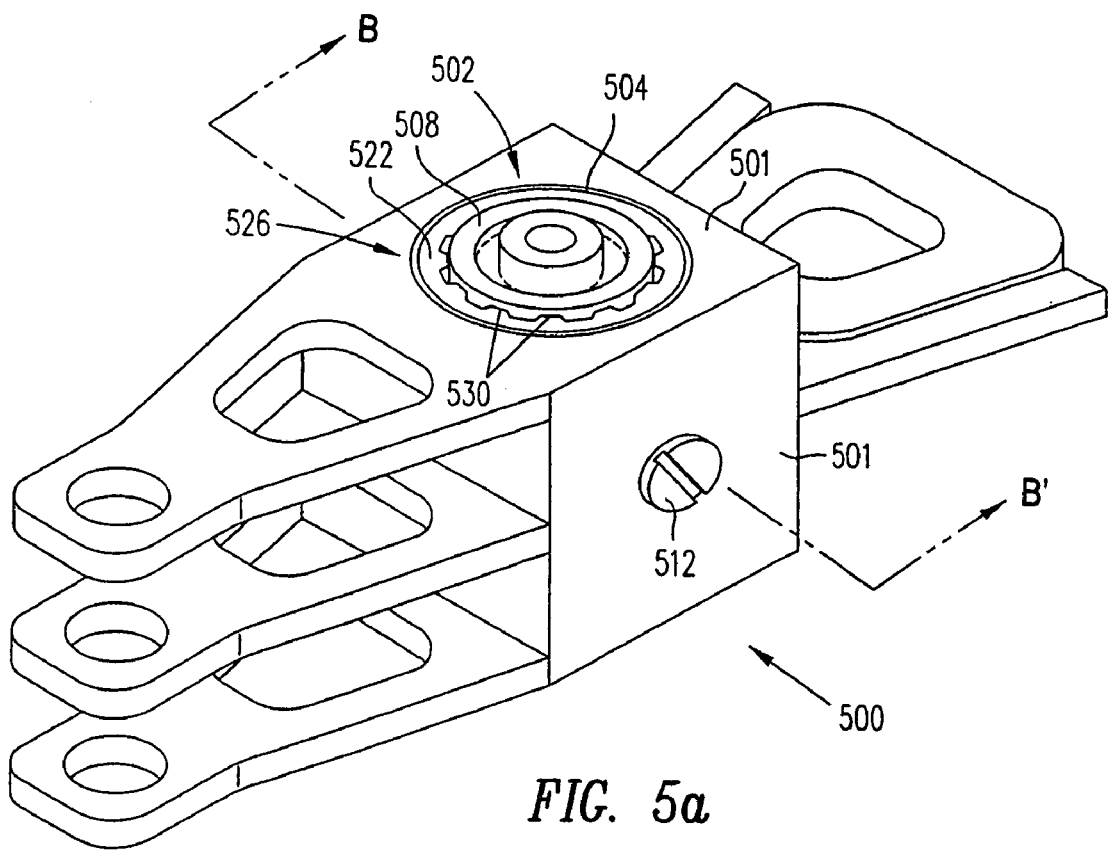
FIG. 5a illustrates a perspective view of an actuator according to an embodiment of the present invention.
Figure 5B:
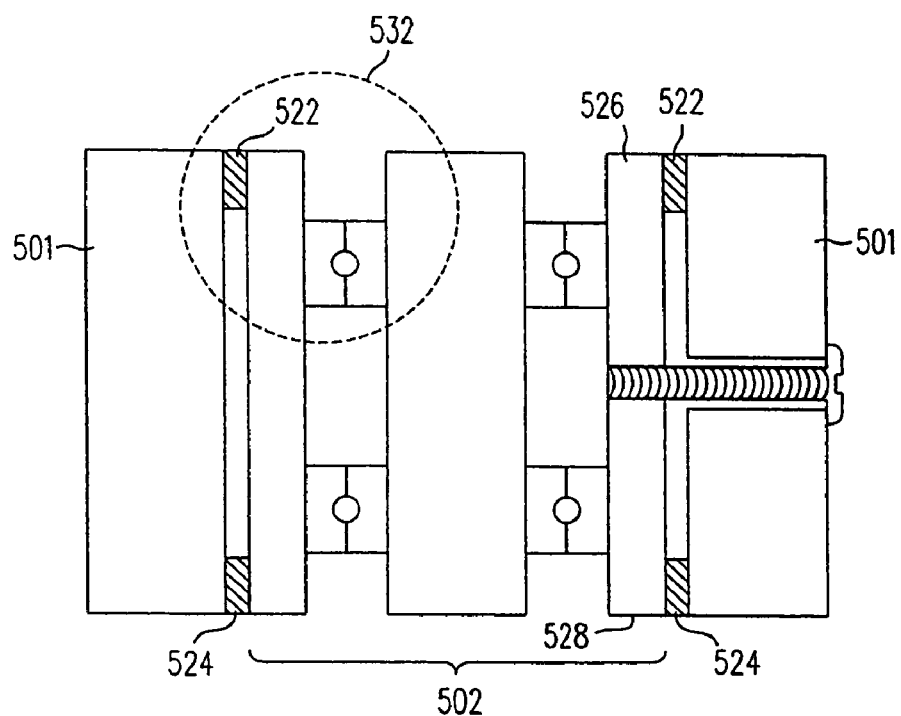
FIG. 5b illustrates a cross sectional view of an actuator according to an embodiment of the present invention.

FIGS. 5a and 5b illustrate an actuator assembly 500 according to an embodiment of the present invention. The view in FIG. 5b is a cross sectional view indicated by the line B–B" in FIG. 5a. The pivot cartridge 502 is mounted in the bore 504 of the actuator body 501. The pivot cartridge 502 having a cylindrical outer portion 508 is supported in the actuator bore 504 by a first corrugated end ring 522 and a second corrugated end ring 524 located at each end 526, 528 of the pivot cartridge 502. The corrugated end rings 522, 524 may be formed from a suitable material such as stainless steel or spring steel. The pivot cartridge 502 in FIG. 5a is illustrated with a pull screw 512. The pull screw 512 may be used within the bore 504 of the actuator arm. However, when using embodiments of the present invention, the pull screw 512 is optional since the end rings 522, 524 are capable of maintaining the position of the pivot cartridge 502 within the bore 504. Eliminating the pull screw results in a more simple manufacturing process. The corrugations in the end rings (reference 530 in FIG. 5*a*) may be formed with suitable methods such as machining, crimping, drop drawing, or other methods known to those skilled in the art.

Figure 6A:
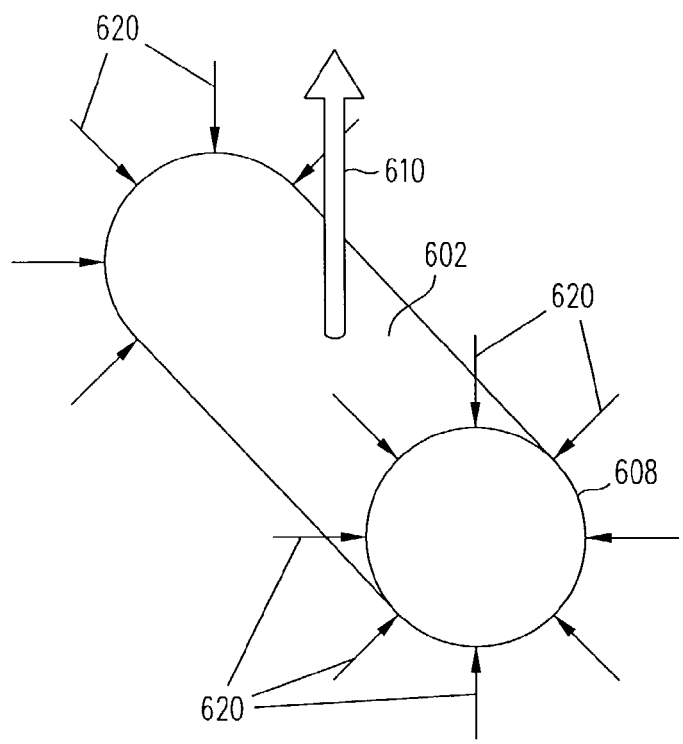
FIG. 6a illustrates a perspective view of the forces on a pivot cartridge using corrugated end ring.
Figure 6B:
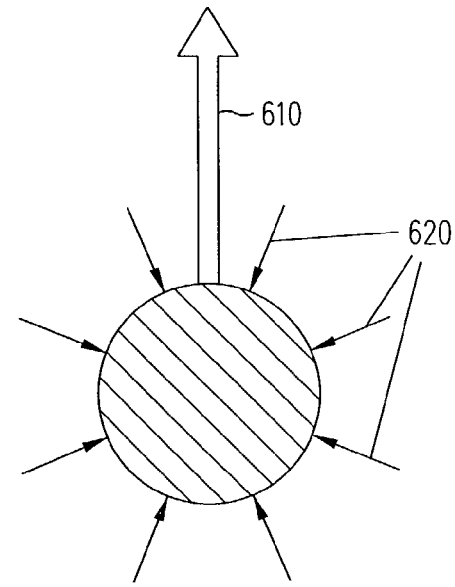
FIG. 6b illustrates a cross sectional view of the forces on a pivot cartridge using corrugated end ring.

FIGS. 6*a* and 6*b* illustrate the more uniform distribution of forces 620 on the cylindrical portion 608 of the pivot cartridge 602 when using a corrugated end ring (522 in FIG. 5*b*). A pull screw exerting a force 610 may optionally be used to affix the pivot cartridge 602 in the actuator bore (not shown). The problems in the prior art associated with an asymmetrical distribution of forces on the cylindrical portion of the pivot cartridge are largely absent when using embodiments of the present invention. An important advantage of the present invention is that the even distribution of forces 620 on the pivot cartridge within the actuator bore greatly reduces the vibrations excited by seeking motions.

FIG. 6*a* illustrates the forces 620 are concentrated near the ends of the pivot cartridge when using corrugated end rings. The prior art, as illustrated in FIG. 3*a* distributes the forces along the length of the pivot cartridge with an emphasis near the pull screw. The present invention is advantageous since the pivot cartridge dynamically performs better when the forces are concentrated near the ends as illustrated in FIG. 6*a*.

Figure 7A:
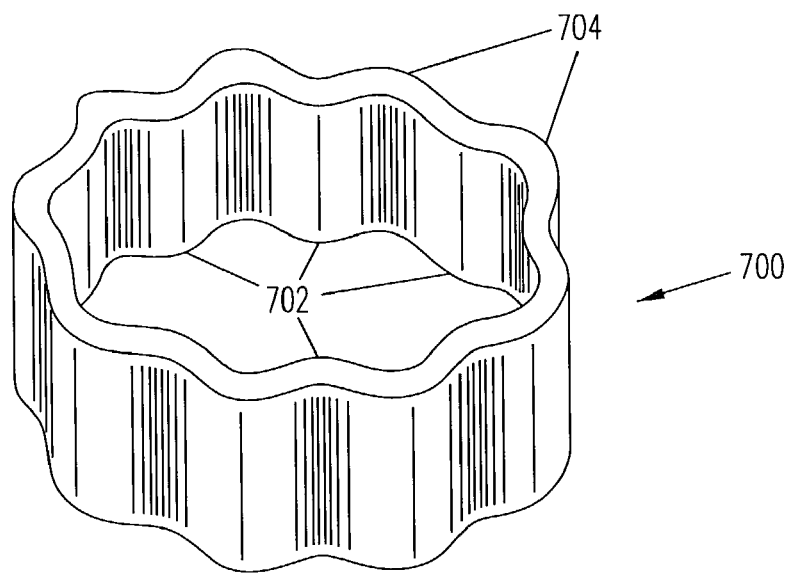
FIG. 7a illustrates a perspective view of a corrugated end ring.
Figure 7B:
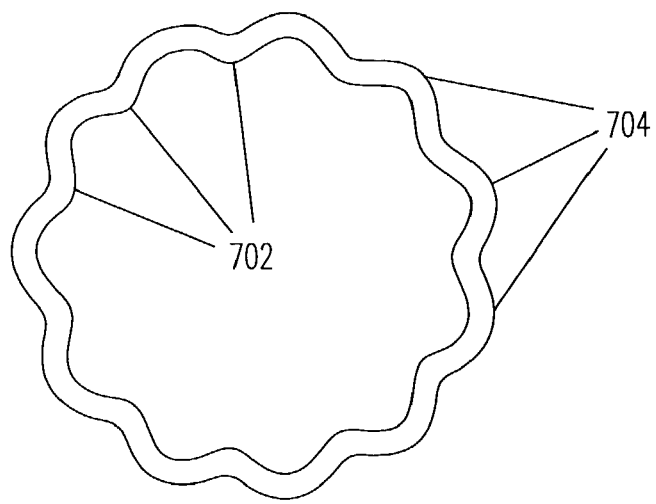
FIG. 7b illustrates a cross sectional view of a corrugated end ring.

FIG. 7*a* illustrates a perspective view of one embodiment of a corrugated end ring 700. The corrugated end ring 700 illustrated in FIG. 7*a* has corrugations 702 on the inside of the ring 700 and also corrugations 704 on the outside of the ring. It is also possible to form corrugations only on either the inside or outside of the corrugated ring. The number of corrugations on either the inside or outside of the corrugated ring is not critical and is typically chosen for convenience to be between 6 and 16. FIG. 7*b* shows an end view of the corrugated end ring 700.

Figure 8A:
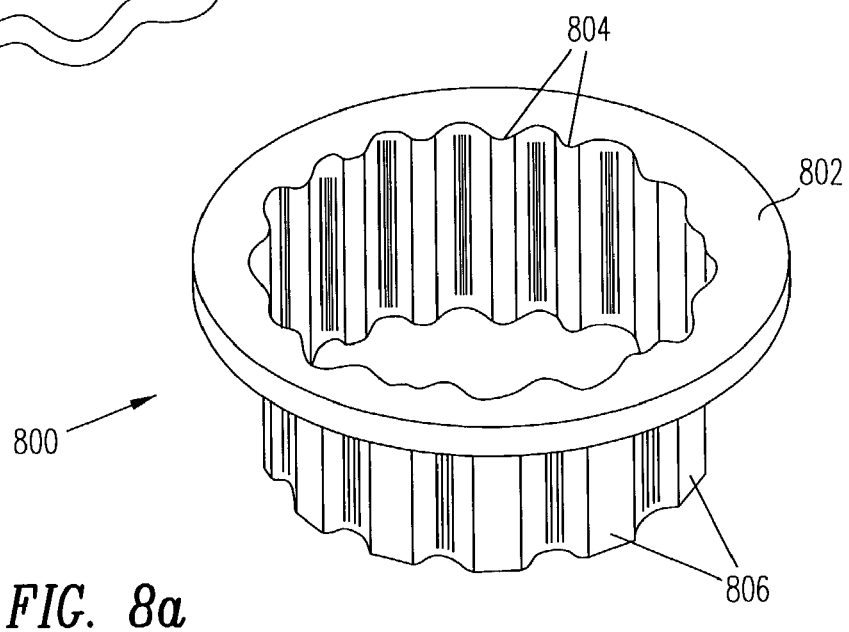
FIG. 8a illustrates a perspective view of a corrugated end ring with a flange.
Figure 8B:
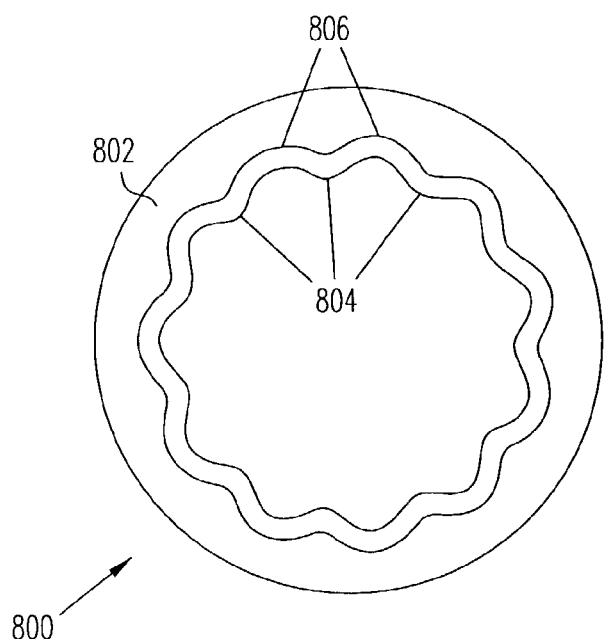
FIG. 8b illustrates a bottom view of a corrugated end ring with a flange.
Figure 8C:
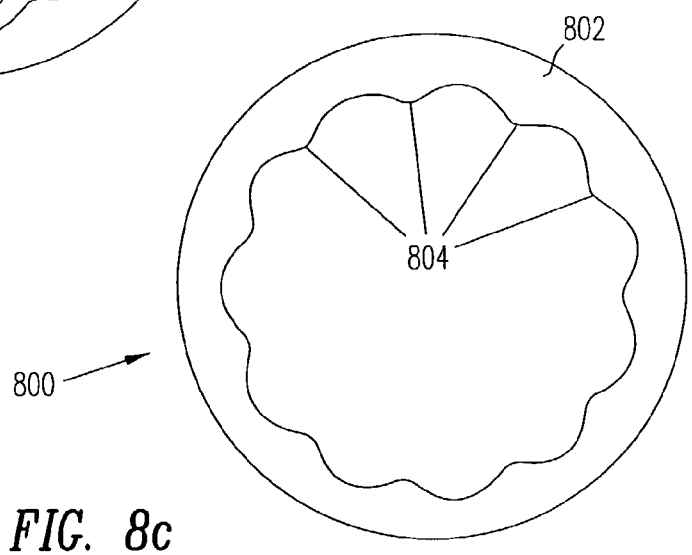
FIG. 8c illustrates a top view of a corrugated end ring with a flange.

An alternative embodiment of a corrugated end ring is illustrated in FIGS. 8*a, b, c,* and *d*. The perspective view of the corrugated end ring 800 illustrated in FIG. 8*a* has a flange 802 which facilitates the assembly of the pivot cartridge in the bore of the actuator. The presence of the flange 802 results in an end ring 800 which is more stiff thereby increasing the precision in uniformly positioning the pivot cartridge (202 in FIGS. 2*a, b*). The corrugated end ring 800 illustrated in FIG. 8*a* also has inner 804 and outer 806 corrugations. FIG. 8*b* illustrates a bottom view of the corrugated ring 800 with a flange 802; and, FIG. 8*c* illustrates a top view of the corrugated ring 800 with a flange 802. Although the corrugated ring in FIGS. 8*a* and *b* are illustrated with both inner 804 and outer corrugations 806, it is possible to form the corrugated ring 800 with corrugations only on the inside or outside. The corrugated end ring with a flange 800 may be formed from known fabrication methods.

Figure 8D:
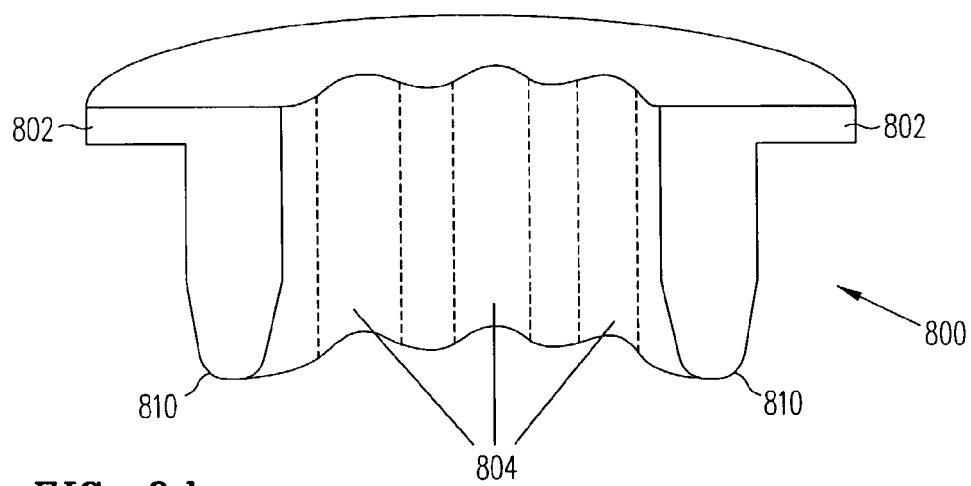
FIG. 8d illustrates a cross sectional view of a corrugated end ring with a beveled portion.

In a another embodiment of the invention, a portion of the end of a corrugated end ring may be beveled or rounded to facilitate damage free assembly during press fitting or swaging. FIG. 8*d* illustrates a cross sectional view of an end ring 800 with a flange 802. The end portion 810 of the end ring 800 is beveled or rounded. The risk of damaging the actuator assembly (500 in FIG. 5*a*) is greatly reduced by forming beveled or rounded edges on the portion 810 of the end ring 800 which is inserted into the bore (504 in FIG. 5*a*).

Figure 9A:
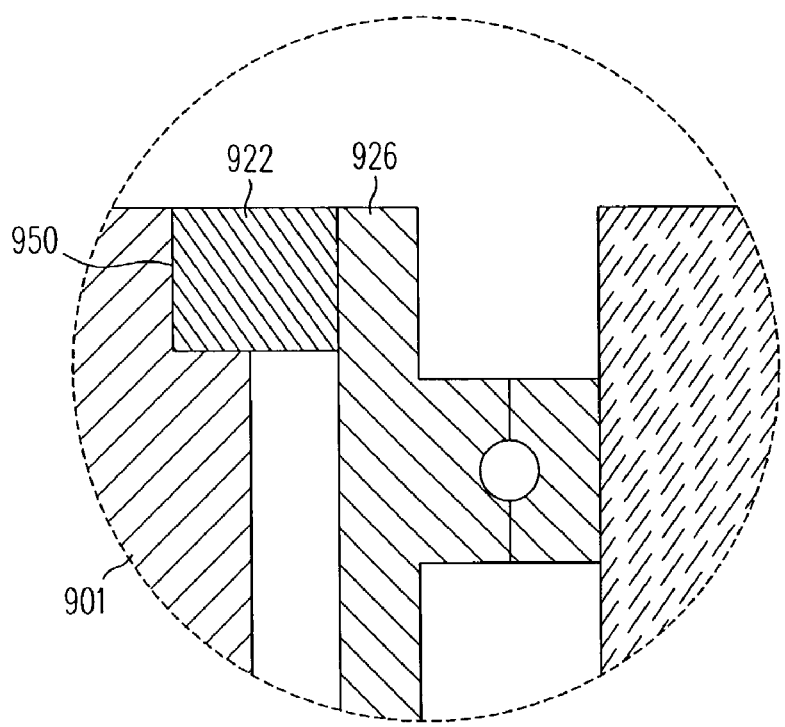
FIG. 9a illustrates a detailed cross sectional view of the placement of a corrugated end ring positioned in a groove in an actuator body.
Figure 9B:
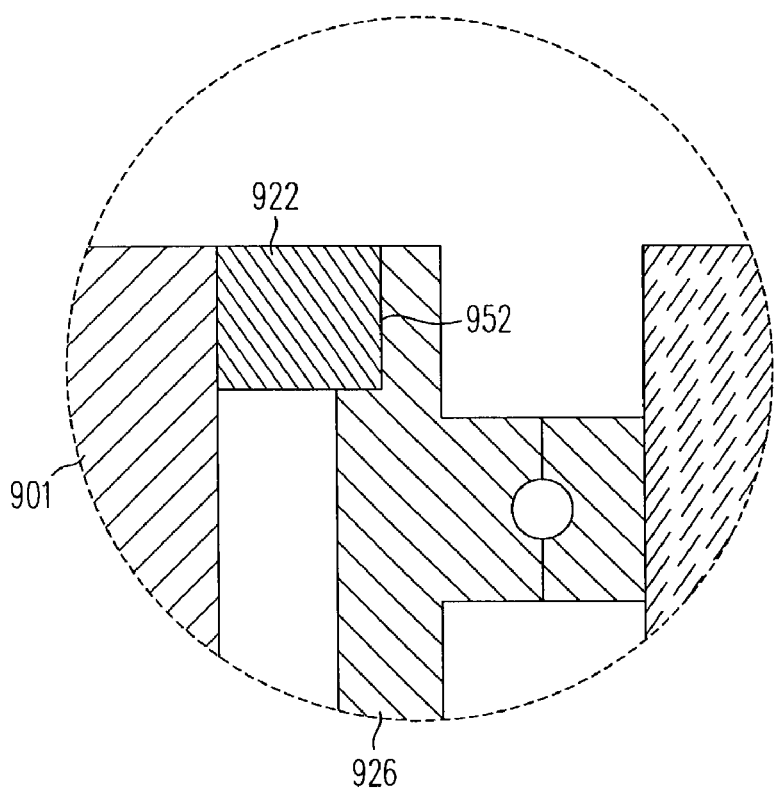
FIG. 9b illustrates a detailed cross sectional view of an alternate placement of a corrugated end ring position in a groove in the pivot cartridge.
Figure 9C:
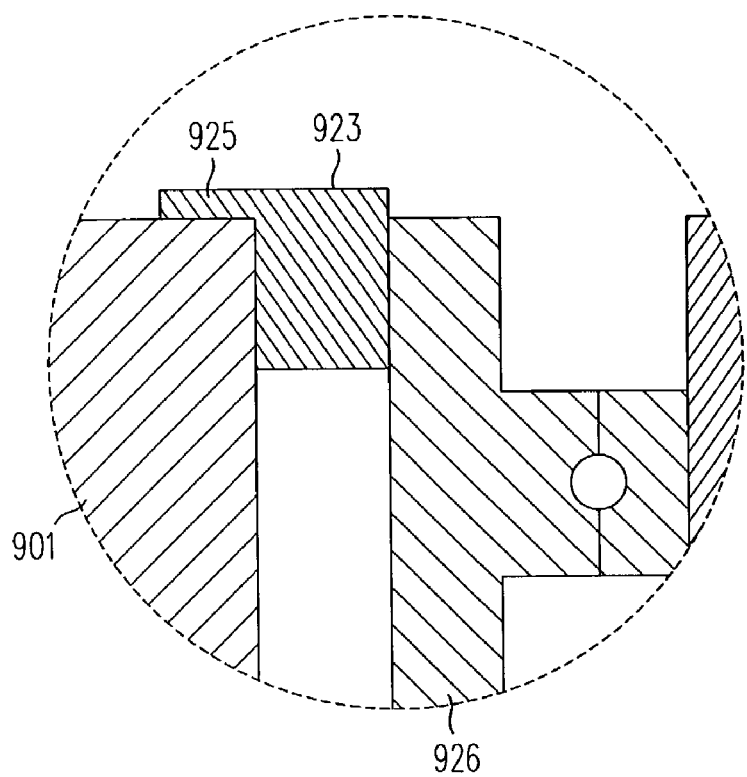
FIG. 9c illustrates a detailed cross sectional view of a placement of a corrugated end ring with a flange; and, FIG. 9d illustrates a detailed cross sectional view of a placement of a corrugated end ring with a flange wherein the flange portion is located in a groove.
Figure 9D:
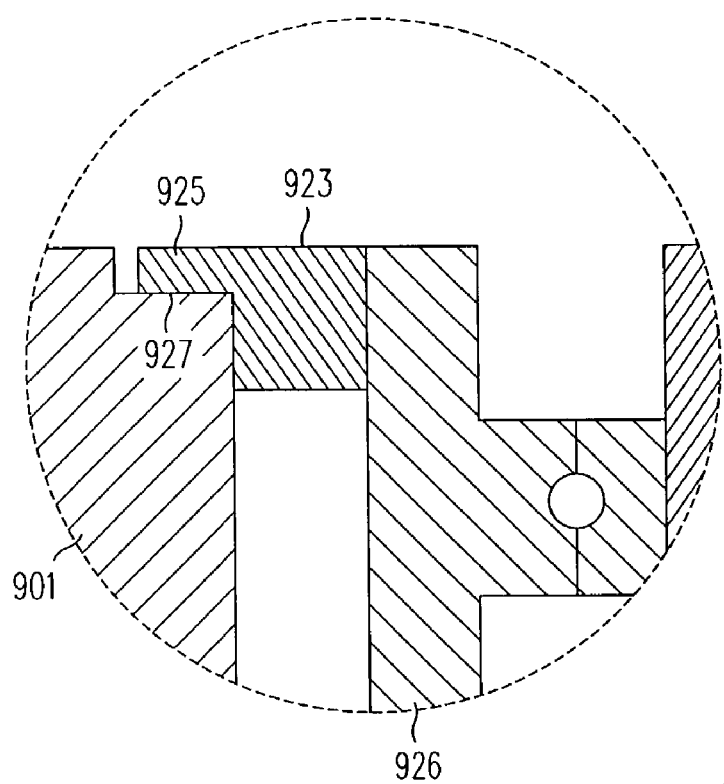

A constraining groove formed in either the actuator bore or in the pivot cartridge is preferable when press fitting or swaging a corrugated end ring between the actuator bore and the pivot cartridge. FIGS. 9*a, b, c,* and *d* illustrate an enlarged view of a portion of the actuator assembly outlined by the circular reference 532 in FIG. 5*b*. Although FIGS. 9*a, b, c,* and *d* show only one corrugated end ring, it is understood that a corrugated end ring would be on each end of the pivot cartridge as was illustrated in FIG. 5*b*. As illustrated in FIG. 9*a*, a groove 950 is formed in the bore of the actuator body 901 which positions the corrugated end ring 922 to the desired location. FIG. 9*b* illustrates an alternative embodiment wherein a groove 952 is formed in the body of the pivot cartridge 926. FIG. 9*c* illustrates the placement of a corrugated end ring 923 with a flange 925 placed between the actuator body 901 and the pivot cartridge 926. In this embodiment, the flange 925 permits the consistent positioning of the corrugated end ring 923. FIG. 9*d* illustrates an alternative embodiment wherein the flange portion 925 of the corrugated end ring 923 is recessed into a groove 927 formed in the actuator body 901.

The embodiments of the corrugated end rings of the present invention, including the illustrated examples in FIGS. 7*a* and 8*a*, are self centering. That is, when using the corrugated end rings, the pivot cartridge is automatically positioned in the middle of the bore. Therefore, registration ridges (224 in FIG. 2*c*) are not necessary. Accordingly, the bore may be formed from one simple milling operation instead of two offset milling operations as required from the prior art (FIGS. 2*c* and 2*d*). This greater simplicity associated with the present invention results in a more simple manufacturing process for the actuator body which has lower cost and higher yield.

From the foregoing it will be appreciated that the actuator assembly with corrugated end caps provided by the present invention offers significantly improved performance. Embodiments of the present invention provide for much more uniform forces on the pivot cartridge and greatly reduced undesirable vibrations.

We claim:

1. A disk drive actuator assembly, comprising:
    an actuator body having a bore with an axis and a first and second end;
    a cylindrical pivot cartridge having a first and second end, wherein said cylindrical pivot cartridge is positioned in said bore;
    wherein said first end of said bore includes a first groove and said second end of said bore includes a second groove;
    a first corrugated end ring supporting said first end of said cylindrical pivot cartridge within said bore and positioned in said first groove;
    a second corrugated end ring supporting said second end of said cylindrical pivot cartridge within said bore and positioned in said second groove; and
    each of the first and second corrugated end rings having a flange, a wall extending orthogonally from the flange in an axial direction, and a tapered end formed at an edge of the axial wall opposite the flange.

2. A disk drive actuator assembly as in claim 1 wherein said cylindrical pivot cartridge is attached in said bore with a pull screw.

3. A disk drive actuator assembly as in claim 1 wherein said first and second corrugated end rings each have between 6 and 16 corrugations.

4. A disk drive actuator assembly as in claim 1 wherein the first and second corrugated end rings are formed from stainless steel.

5. A disk drive actuator assembly as in claim 1 wherein the first and second corrugated end rings are joined between said cylindrical pivot cartridge and said bore without fasteners and by a method selected from press fitting and swaging.

6. A disk drive, comprising:

a magnetic recording disk;

a head gimbal assembly including a magnetic recording head for recording information on said disk;

an actuator assembly, connected with said head gimbal assembly, having a bore with a first and second end;

a cylindrical pivot cartridge having a first and second end positioned in said bore;

wherein said first end of said bore includes a first groove and said second end of said bore includes a second groove;

a first corrugated end ring supporting said first end of said cylindrical pivot cartridge within said bore and positioned in said first groove;

a second corrugated end ring supporting said second end of said cylindrical pivot cartridge within said bore and positioned in said second groove;

the first and second corrugated end rings are joined between said cylindrical pivot cartridge and said bore without fasteners and by a method selected from press fitting and swaging; and each of the first and second corrugated end rings has a flange that seats in the respective groove.

7. A disk drive according to claim 6, wherein each of the first and second corrugated end rings has a wall extending in an axial direction, and a tapered end formed at an edge of the axial wall.

8. A disk drive actuator assembly, comprising:

an actuator body having an axis, a bore extending in an axial direction, a first end including a first groove formed in the bore, and a second end including a second groove formed in the bore;

a pivot cartridge having a first and second end, and the pivot cartridge is positioned in the bore;

a first corrugated end ring supporting the first end of said pivot cartridge within the bore and positioned in the first groove;

a second corrugated end ring supporting the second end of the pivot cartridge within the bore and positioned in the second groove; and each of the first and second corrugated end rings has an axial wall and a tapered end formed at an end of the axial wall.

9. A disk drive actuator assembly according to claim 8, wherein each of the first and second corrugated end rings has a flange that seats in the respective groove.

10. A disk drive actuator assembly according to claim 8 wherein the first and second corrugated end rings are joined between the pivot cartridge and the bore without fasteners and by a method selected from press fitting and swaging.

* * * * *